United States Patent [19]

Dolgas et al.

[11] Patent Number: 5,525,774
[45] Date of Patent: Jun. 11, 1996

[54] METHOD AND APPARATUS FOR FUSING LEAD WIRES OF COILS TO TERMINALS

[75] Inventors: Patrick A. Dolgas, Milford; Mark T. Heaton, Springfield, both of Ohio

[73] Assignee: Globe Products Inc., Huber Heights, Ohio

[21] Appl. No.: 291,390

[22] Filed: Aug. 16, 1994

[51] Int. Cl.⁶ .................. B23K 9/12; B23K 9/32
[52] U.S. Cl. .............. 219/89; 219/56.1; 219/56.22; 219/86.25; 219/86.9
[58] Field of Search ............... 219/56.1, 56.22, 219/86.25, 86.51, 86.61, 86.7, 86.9, 89; 91/461

[56] References Cited

U.S. PATENT DOCUMENTS

| | | | |
|---|---|---|---|
| 1,252,143 | 1/1918 | Murray et al. | |
| 2,850,619 | 9/1958 | De Lucia | 219/89 |
| 2,905,804 | 9/1959 | Wakeley | 219/86 |
| 3,011,045 | 11/1961 | Stoltz et al. | 219/86 |
| 3,045,103 | 7/1962 | Warner | 219/78 |
| 3,727,822 | 4/1973 | Umbaugh | 228/1 |
| 3,949,646 | 4/1976 | Taylor | 91/461 |
| 4,001,539 | 1/1977 | Franchi et al. | 219/110 |
| 4,371,772 | 2/1983 | Szantho et al. | 219/89 |
| 4,484,056 | 11/1984 | Rossell | 219/86.51 |
| 4,504,724 | 3/1985 | Szantho et al. | 219/86.25 |
| 4,697,058 | 9/1987 | Mueller | 219/56.21 |
| 4,733,042 | 3/1988 | Nishiwaki et al. | |
| 4,791,265 | 12/1988 | Senni et al. | 219/91.2 |
| 4,817,848 | 4/1989 | Gabaldon | 228/102 |
| 5,063,279 | 11/1991 | Rossi | 219/86.51 |
| 5,111,015 | 5/1992 | Riordan | 219/56.22 |
| 5,331,130 | 7/1994 | Kirker | 219/86.51 |
| 5,418,347 | 5/1995 | Kirker | 219/110 |

FOREIGN PATENT DOCUMENTS

| | | | |
|---|---|---|---|
| 62-282785 | 12/1987 | Japan | 219/86.51 |
| 2063133 | 6/1981 | United Kingdom | 219/89 |

OTHER PUBLICATIONS

Drawing No. 061279 from Soudax Equipment, 21 rue de la breche, 78680 EPONE, showing air operated prior art fusing machine.
Drawing No. 171121 from Soudax Equipment, 21 rue de la breche, 78680 EPONE, showing electromagnetically operated prior art fusing machine discussed in the instant application.

*Primary Examiner*—Teresa J. Walberg
*Assistant Examiner*—J. Pelham
*Attorney, Agent, or Firm*—Roger S. Dybvig

[57] ABSTRACT

A fusing electrode is mounted on a vertically movable carriage which is raised by a first air actuator and lowered by gravity into engagement with a commutator tang. During a fusing cycle, different pressures are applied between the fusing electrode and the tang by means of a fast-acting air actuator that has a downwardly-extending piston rod engageable with the carriage and which is controlled by a programmable pressure regulating valve. To increase the response time and the force follow through of the second air actuator, the programmable pressure regulating valve is mounted directly on top of the second air actuator with its air outlet located as close to the cylinder of the second actuator as permitted by the air fittings which connect them. Surge tanks associated with the programmable valve assist in ensuring speedy response times.

9 Claims, 3 Drawing Sheets

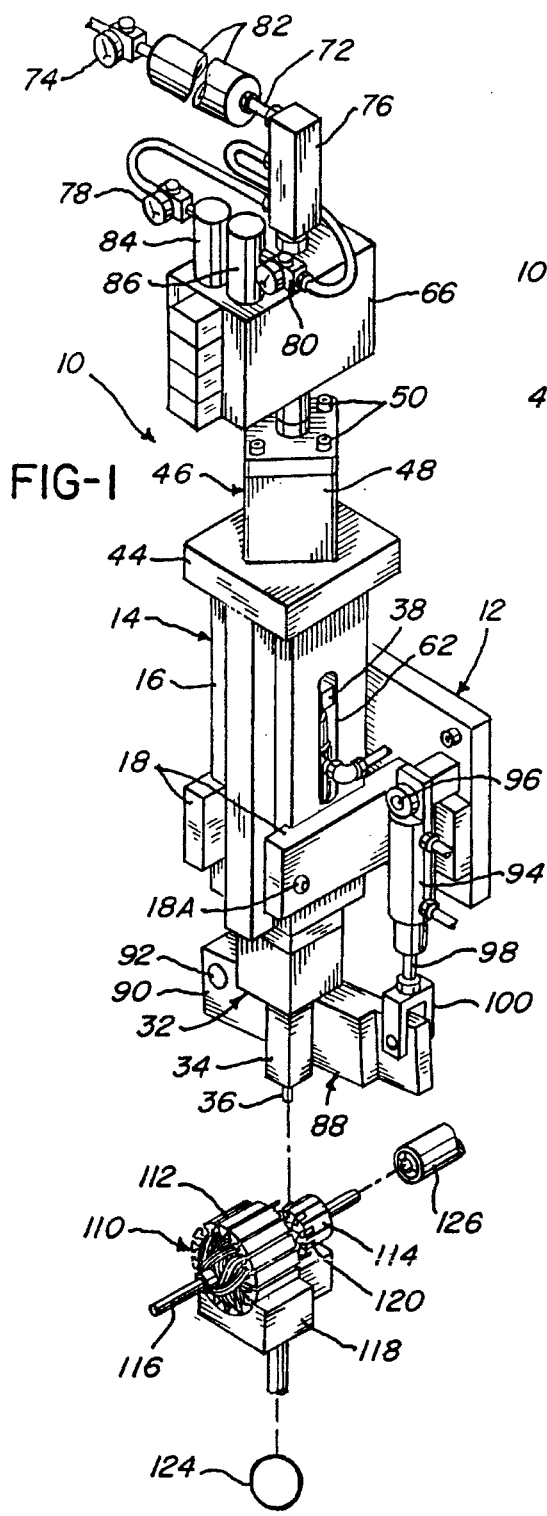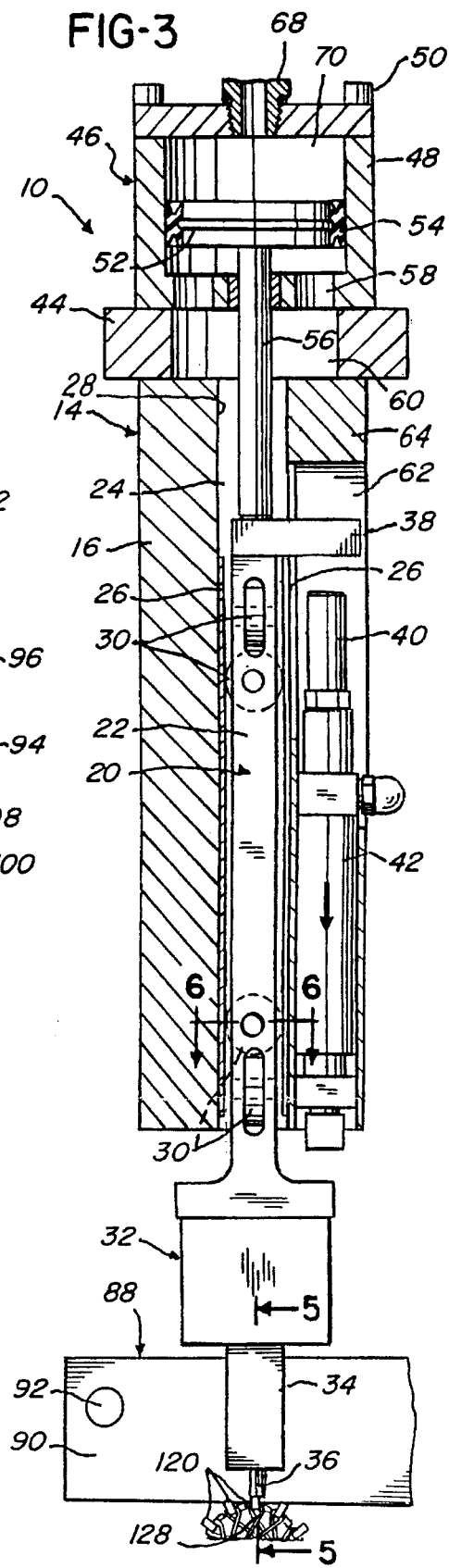

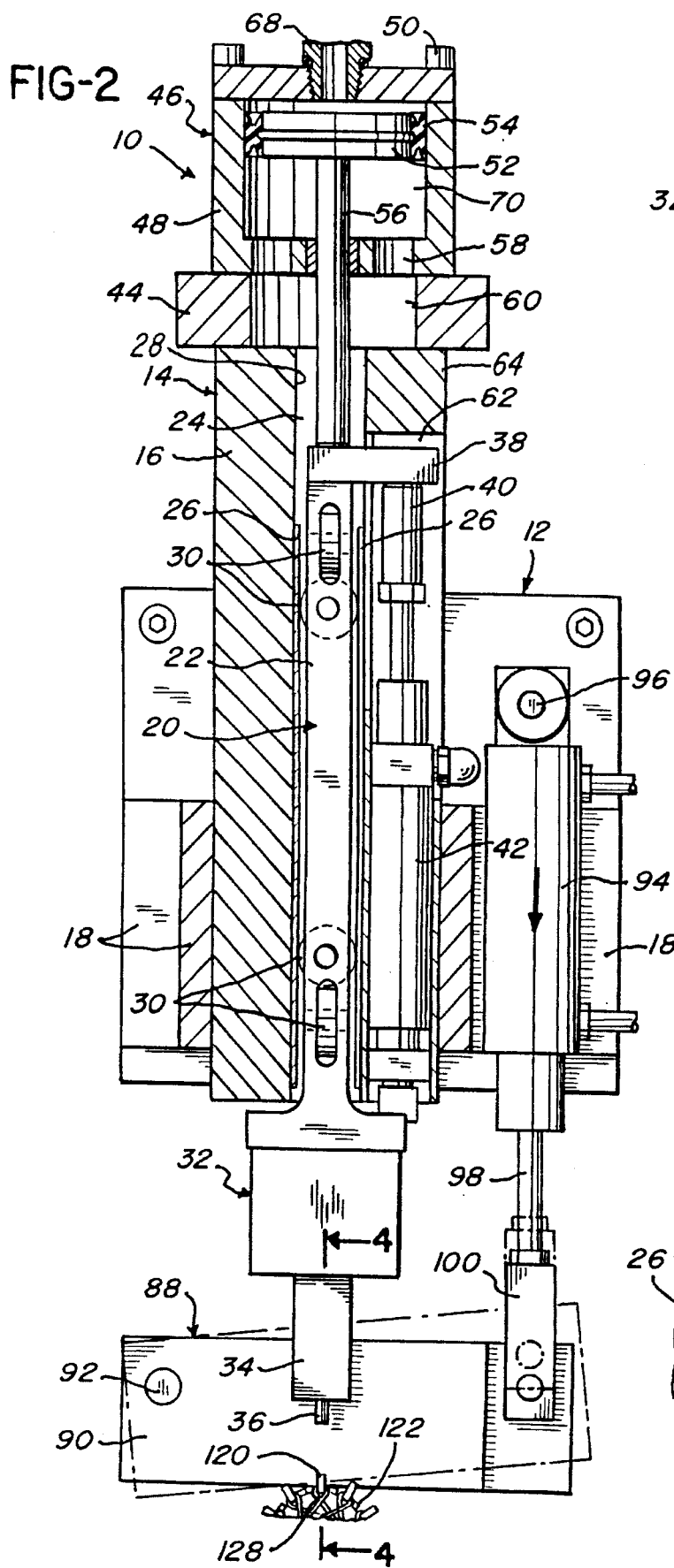

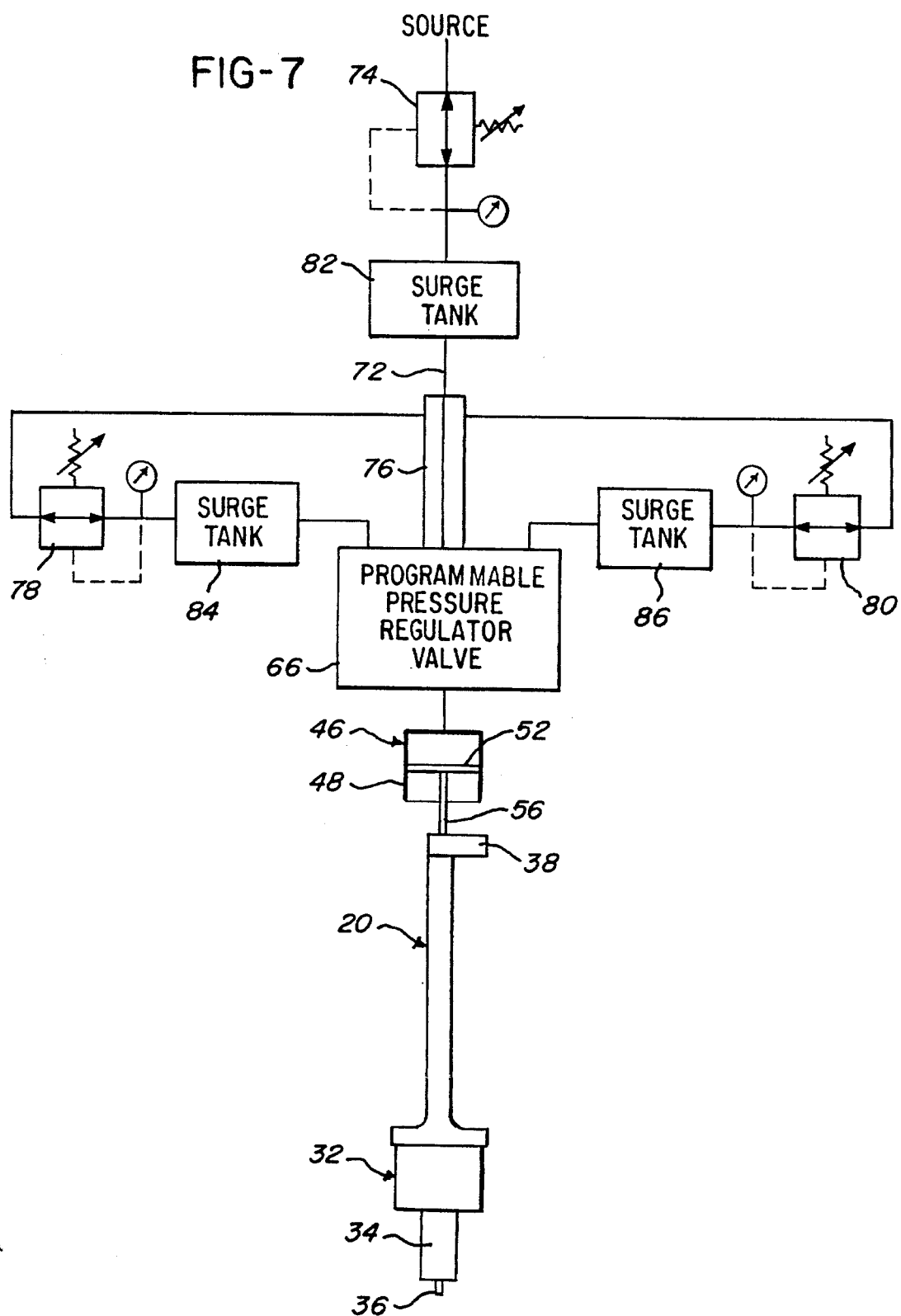

METHOD AND APPARATUS FOR FUSING LEAD WIRES OF COILS TO TERMINALS

FIELD OF THE INVENTION

This invention relates to a method and apparatus for fusing lead wires of coils to terminals and, although not so limited, this invention is particularly directed to a method and apparatus for fusing lead wires of coils of electric motor armatures to commutator bars having wire-lead receiving hooks or tangs.

BACKGROUND OF THE INVENTION

Various methods and apparatus have been developed for fusing lead wires of coils to terminals, including methods and apparatus for fusing lead wires of coils of electric motor armatures to commutator bars. Fusing apparatus for connecting lead wires to commutator bars conventionally include a grounding electrode that engages the commutator bar at a point remote from the point at which the lead wire is to be secured to the commutator and a fusing electrode that engages the commutator at or quite close to the point of connection of the lead wire to the commutator bar.

When fusing commutators having lead-receiving hooks or tangs around which the lead wires are looped, the fusing electrode engages the radially outer portion of a tang and, during the fusing cycle when a high current is passed from the fusing electrode through the commutator bar to the grounding electrode, a generally radially-directed force is exerted on the tang by the fusing electrode, causing it to be bent into engagement with the bar substantially completely along the length of the tang, with the tang and the commutator bar in surrounding relation to a segment of the coil lead wire or lead wires looped around the tang. Based on empirical studies, it is known that the pressures applied to the tangs during the fusing cycle should be varied in a timed sequence throughout the duration of each fusing cycle. The optimum criteria for the degrees of pressures to be applied, for the sequences with which the pressures are changed, and for the times during which each pressure is applied will vary from one type of armature to another. Accordingly, it is common practice to undergo a series of trial sequences of force applied to the tangs of an armature of a particular construction until a sequence is determined that produces the fusion characteristics being sought for that particular armature. The fusing machine is then controlled in such a manner as to repeat the same sequence of pressure application for every armature of that particular construction.

Each fusing operation requires only a few line cycles to complete. Therefore, the mechanisms by which different pressure are applied to the tangs must have a good response time. ("Response time" as used herein refers to the time between which a signal is generated to initiate a change in pressure and the time the new pressure is applied.) Also, as a tang becomes heated during the fusing cycle, a stage is reached at which the tang acquires a plastic state and loses its resistance to the pressure applied by the fusing electrode. Optimally, the pressure applied to the tang by the fusing electrode will remain essentially constant. The characteristic of a fusing machine to operate to continue to exert a uniform pressure to a tang which has become heated to a plastic state is known as "force follow through." A machine having good force follow through will apply an essentially uniform preset or desired pressure to the tang even when the tang has been heated to become plastic.

To economically meet high speed production requirements, the fusing machine must be so designed that successive fusing operations are completed in rapid succession. The fusing machine must also be so designed that excessive pressures not be applied to tangs at any time. Of particular concern is that the fusing head, when it first engages a tang before the tang is heated by the fusing current, will do so with a force which is sufficiently low that the cold tang will not be bent. Otherwise, the tang may be bent in an uncontrolled manner which may not be repeated from one tang to the next, so that non-uniform and unreliably fused tangs and lead wires may result. For the same reason, when pressure is thereafter applied upon initiation of the fusing current, it is desirable that the pressure be evenly applied without an abrupt hammering of the tang, as would occur if the tang were struck or impacted against by a pressure applicator.

Prior fusing machines have used pneumatic or electromagnetic actuators or combinations thereof, either with or without associated spring devices, and electric motors, for applying forces to fusing heads to create the desired pressures between the tangs and the fusing heads. However, the known machines are relatively complex or expensive, or require exceedingly expensive controls, and many machines do not provide for adequate control of the forces exerted against the tangs. Many such machines do not exhibit good force follow through.

SUMMARY OF THE INVENTION

An object of this invention is to provide an improved method and apparatus for fusing lead wires of coils to terminals and, in particular, for fusing lead wires of coils of electric motor armatures to commutator bars.

More particularly, an object of this invention is to provide an improved method and apparatus for fusing lead wires of coils to terminals such as coils of electric motor armatures to commutator bars having tangs, which provide good pressure control, a reasonably fast response time, and good force follow through.

A fusing machine in accordance with this invention includes a stationary assembly including a housing and a vertically movable assembly including an electrode carriage and an electrode assembly mounted on the lower end of the electrode carriage. A low-friction guide assembly within the housing guides the carriage relative to the stationary assembly for movement along a vertical path.

Relatively large vertical movements of the movable assembly toward and away from the workpiece are controlled by a first air actuator. The first air actuator is conveniently mounted on the housing and has an upwardly-extending piston rod engageable with the carriage for raising the carriage and, thereby, the electrode assembly, and supporting the carriage and the electrode assembly in elevated positions.

Upon downward retraction of the piston rod of the first air actuator, the entire movable assembly moves downwardly under the force of gravity until the electrode tip of the electrode assembly engages the workpiece to be fused. The piston rod of the first air actuator may move downwardly at a speed exceeding the speed at which the movable assembly falls freely, so the movable assembly will fall freely until further downward movement is prevented by the engagement of the tip of the electrode assembly with the workpiece. When fusing a coil lead and a commutator bar of the armature of a typical universal motor, the fusing head will only lower by one-fourth of an inch or so so that it will not apply a significant force to a tang it falls onto. Optionally, the piston of the first air actuator may move downwardly at a slower rate in order to control the rate of descent of the movable assembly, and thereby the force with which the fusing head engages a tang.

A fast-acting, second air actuator, which is preferably mounted on the housing has a downwardly-extending piston rod aligned with the vertical path of movement of the carriage and is engageable with the carriage for applying variable, downwardly-exerted pressures to the electrode assembly during each fusing cycle. The second air actuator is termed "fast-acting" because it reacts quickly to differing pressure conditions. Its fast-acting characteristics are obtained by minimizing the resistance to downward movement of its piston.

An electronic programmable pressure-regulating valve mounted on the cylinder of the second air actuator is used to accurately maintain and to accurately change the downwardly-exerted forces in accordance with a preset time sequence of programmably selected preset pressures. Preferably, the programmable pressure regulating valve is mounted directly on top of the second air actuator with its air outlet located as close to the cylinder of the second actuator as permitted by the air fittings which connect them. With this constructions as opposed to constructions in which actuators are located remotely from pressure regulators, relatively small amounts of air must be moved in order to effect a pressure increase or decrease. Optionally, an accumulator or surge tank is located upstream of the main air line to the programmable pressure regulator so that ample reserve air is close at hand to ensure that the operation of the programmable pressure regulator and the second actuator will not be slowed by a lack of available air with which to change or maintain the forces exerted by the second air actuator. A programmable pressure regulator is preferably used which has low and high pressure limit regulators, and preferably these have associated accumulators or surge tanks to ensure that the desired limits are maintained during the entire fusing cycle. The piston rod of the second air actuator is preferably not connected to the fusing electrode assembly. Accordingly, the fusing electrode assembly can lower under the influence of gravity without being slowed by the internal resistance or stiction of the second air actuator. For the same reason, the second cylinder need not apply a driving force to lower the fusing electrode assembly. In order to avoid having the piston rod of the second air actuator impact against the electrode carriage when the movable assembly is in its lowered position, a slight air pressure may be maintained in the cylinder of the second actuator sufficient to overcome the internal friction or stiction of the second air actuator so that its piston rod descends along with the movable assembly as the movable assembly lowers into engagement with the workpiece. Accordingly, when the second actuator is first energized during a fusing cycle to cause the electrode tip to apply pressure to the workpiece, the piston rod will simply push downwardly on the electrode carriage, causing the electrode tip to bear with greater pressure against the workpiece. There is no downward movement of the piston rod relative to the electrode carriage at this point in time so that the piston rod does not impact against the electrode carriage and cause unwanted excessive pressures between the electrode tip and the workpiece.

In accordance with the method of this invention, an armature is located at a fusing station in an armature-supporting nest located in the path of vertical travel of the movable assembly. The piston rod of the first air actuator is then lowered so that the movable assembly falls under the influence of gravity whereupon the tip of the electrode assembly, which was being held in an elevated position by the first air actuator, is permitted to lower into engagement with the workpiece. When the electrode assembly is so lowered, a fusing current is supplied to the electrode assembly while a downward pressure is applied to the movable assembly by the second air actuator. Preferably, the downward pressure exerted by the second air actuator will be varied during the course of each fusing cycle in accordance with a preset sequence of pressures which will be determined empirically and will depend on the particular workpiece being fused. After completion of a fusing cycle, the air pressure is removed or mostly removed from the second air actuator so that it will not impede upward movement of the movable assembly. The movable assembly is then moved upwardly by energization of the first air actuator, where it remains in readiness for the next fusing operation.

Other objects and advantages will become apparent from the following description and the drawings.

BRIEF DESCRIPTION OF THE DRAWINGS

FIG. 1 is a partly exploded, simplified perspective view of a fusing machine in accordance with this invention and an armature to be fused.

FIG. 2 is a fragmentary, vertical cross-sectional view, with parts broken away, of the machine and the armature of FIG. 1.

FIG. 3 is a fragmentary, vertical cross-sectional view, with parts broken away, of a portion of the machine and the armature illustrated in FIG. 2 but representing parts of the machine and the armature at a different point in time in the sequence of operation.

FIG. 4 is a fragmentary elevational view, with parts in cross section, taken along line 4—4 of FIG. 2, with the armature shown partly in phantom.

FIG. 5 is a fragmentary elevational view, taken on line 5—5 of FIG. 3 and is similar to FIG. 4 but represents parts of the machine and the armature at a different time in the sequence of operation of the machine.

FIG. 6 is a fragmentary cross-sectional view of a portion of the machine taken along line 6—6 of FIG. 3.

FIG. 7 is a schematic view of a pneumatic circuit used to apply different forces to a fusing head of the machine of this invention during each fusing cycle, and includes a diagrammatic representation of a movable assembly that includes the fusing head.

DETAILED DESCRIPTION

With reference to FIGS. 1, 2 and 3, a fusing machine, generally designated 10, in accordance with this invention comprises a fixed frame, generally designated 12, and a stationary assembly, generally designated 14, that includes a vertically extending housing 16. The housing 16 is mounted on part of the frame 12 in an adjustably fixed position by a pair of mounting plates 18 and suitable fasteners 18A.

A vertically movable assembly, generally designated 20, is mounted for vertical movement with respect to the stationary assembly 14. The movable assembly 20 includes an electrode carriage 22 guided, as shown in FIGS. 2, 3 and 6, for movement within a vertical channel or rectangular through bore 24 within the housing 16 by cooperating guide rails 26 provided on the internal housing surfaces, designated 28, that form the vertical housing bore 24 and guide rollers 30 mounted on the carriage 22.

With continued reference to FIGS. 1, 2 and 3, a fusing electrode assembly or head, generally designated 32, is mounted on the bottom of the carriage 22 and includes a copper electrode holder 34 and a fusing electrode tip 36. Fusing electrode tip 36 may be made of any suitable fusing electrode material, which is typically but not necessarily tungsten, as those familiar with the art will be aware. Here it may be noted that the electrode head 32 may be entirely conventional and the representation of the machine has been simplified to omit disclosures of electrical connections to the electrode head 32, coolant apparatus, or sensors which may be used with the electrode head 32.

The upper end of the carriage 22 includes an integral, horizontal motion transmitting member or lug 38 located above and in alignment with an upwardly extending, vertically movable piston rod 40 of a double acting, first air actuator 42 mounted on the housing 16. The piston rod 40 engages the downwardly facing surface of the lug 38 to lift the movable assembly 20 at the end of each fusing cycle, to retain the movable assembly 20 in an elevated position until the start of the next fusing cycle, and to permit the lowering of the movable assembly 20 to initiate the next fusing cycle.

A housing cap or mounting plate 44 at the top of the housing 16 supports a low friction or fast-acting, second air actuator, generally designated 46, which includes a cylinder 48 affixed to the mounting plate 44 by screws 50 which extend through the wall of the cylinder 48 into the mounting plate 44. The second air actuator also includes a piston 52 slidably mounted by a lip seal 54 within the cylinder 48, and a piston rod 56 extending downwardly toward and in vertical alignment with the carriage 22. The second air actuator 46 is characterized herein as having low friction, or as being fast-acting, because there is minimal resistance to downward movement of its piston 52. To this end, the bottom wall of its cylinder 48 is almost completely open to atmosphere so that no back pressure can be developed in the cylinder 48 beneath the piston 52. Thus, the bottom wall of the cylinder 48 has large apertures 58 which open to a central opening 60 in the mounting plate 44, the latter opening 60 being in open communication with the atmosphere through the vertical channel or bore 24 in the housing 16, and a large slot 62 located in the sidewall, designated 64, of the housing 16 in which the first air actuator 42 and the carriage lug 38 are located.

With reference to FIGS. 1 and 7, an electronic programmable pressure regulating valve 66 is mounted on top of the cylinder 48 and has an air outlet opening (not shown) connected by a hollow fitting 68 to the hollow chamber, designated 70, inside the cylinder 48. Pressure regulating valve 66 is connected to a suitable source of air under pressure by means of a main air line 72 which is a pressure regulated by a main regulating valve 74 and connected to a manifold 76 mounted on top of the programmable valve 66. The programmable valve 66 is programmable to supply air under various different selected and accurately controlled preset pressures to the cylinder 48 of the second air actuator 46 between pressure limits determined by a pair of control valves, namely a first, low pressure limit regulating valve 78 and a second, high pressure limit regulating valve 80. Programmable pressure regulating valves suitable for this purpose are commercially available, one example being a valve sold under the commercial name "PAR-15 Valve" by Schrader Bellows Pneumatics, P.O. Box 631, Akron, Ohio 4439-0631, so details of the construction of the programmable valve 66 are not included herein.

A main accumulator or surge tank 82 is preferably located between the source and the manifold 76 and control accumulators or surge tanks 84 and 86 are associated, respectively, with the low pressure limit regulating valve 78 and the high pressure limit regulating valve 80.

Referring to FIGS. 1, 2 and 4, a ground electrode assembly, generally designated 88, is used in association with the fusing electrode 36. The ground electrode assembly 88 forms no part of this invention and may be entirely conventional. The illustrated assembly 88 includes a ground electrode 90 pivotally mounted by a pivot pin 92 to a part (not shown) of the frame 12. A double acting, third air actuator 94, which is pivotally mounted on the frame 12 by a pivot member 96, has a depending piston rod 98 connected by a clevis 100 to the ground electrode 90.

With reference to FIG. 1, an electric motor armature, generally designated 110, having a core 112 and a commutator 114 mounted on an armature shaft 116, is supported by a suitable nest 118 with the commutator tangs, designated 120, which project from individual commutator bars, designated 122, in vertical alignment with the fusing tip of electrode 36. The nest 118 is preferably vertically movable into and out of a fusing station by means of a suitable air actuator 124. When the armature 110 is located in the fusing station, a collet 126 engages the commutator end of the armature shaft 116. As well known, the collet will be rotatably indexed by means (not shown) between successive fusing cycles to present different commutator tangs in vertical alignment with the fusing electrode tip 36.

With reference to FIGS. 2 through 5, the process for fusing an armature coil lead wire, designated 128, to the commutator bar 122 will now be described. At the outset, with the electrode carriage in the raised position shown in FIG. 2, a tang 120 of a commutator bar 122 in the fusing station is aligned with the fusing electrode tip 36 and the first air actuator 42 is operated to lower away from its raised position. The electrode carriage 22 accordingly lowers by gravity until stopped by engagement of the fusing electrode tip 36 with the tang 120. At this time, a slight balancing pressure is preferably applied to the piston 52 of the second air actuator 46 which is just sufficient to overcome the resistance to movement of the piston 52 created by the seal 54. This will permit the piston rod 56 to follow downwardly with the electrode carriage 22. As soon as the electrode tip 36 engages the tang 120 in the fusing station, a first pressure is applied by the second air actuator 46 to the carriage 22 so that a complete engagement of the fusing electrode tip 36 with the tang 120 is assured. The fusing current can then be initiated by a conventional weld controller, as known to those familiar with the art. At preset time intervals during the fusing cycle, the pressure exerted against the workpiece is changed by operation of the programmable valve 66 to selected different pressures. We have found that it is useful to change pressure two times during each fusing cycle, but more or fewer changes could be used if necessary to produce desired results. During the fusing cycles, the fusing current may be changed in accordance with either preset or feedback controls which may be different for different fusing machines and by means which forms no part of the instant invention.

At the end of a fusing cycle, the fusing current is discontinued. Pressure may still be applied for a brief hold time. Thereafter, the air pressure applied to the second air actuator 46 is dropped to the initial slight balancing pressure. The first air actuator 42 is then actuated to raise the electrode carriage 22 and its electrode assembly 32 so that the electrode tip 36 is out of engagement with the commutator bar 122. The upwardly moving electrode carriage 22 drives the piston 52 of the second air actuator 46 upwardly to its starting position shown in FIG. 2. The armature 110 can then be indexed to present a different commutator bar 122 and lead wire 128 in position to be fused and the foregoing fusing steps repeated.

The programmable regulator valve 66 is mounted on top of the second air actuator 46 as close thereto as the air connections therebetween will permit, and there is very little resistance to movements of the piston 52 of the second air actuator 46. Accordingly, when a tang becomes heated to a plastic state during a fusing operation, the second actuator 46 responds quickly to the change in resistance offered by the tang and there is no significant change in the pressure applied by the electrode tip 36 to the tang.

The method and apparatus of this invention are preferably practiced with a vertically oriented assemblies illustrated in the drawings and described above. However, it will be apparent that the method and apparatus of this invention could be practiced with the assemblies described above oriented horizontally provided of course that a suitable nest is provided to retain armature aligned with the horizontally moveable electrode tip. The advantages of the lowering of the electrode carriage 22 by gravity would, of course, not be obtained if the carriage 22 were horizontally moveable. However, the function of gravity in the operation of the vertical arrangement disclosed herein could be replaced by appropriate control of the second air actuator 46.

Although the presently preferred embodiment of this invention has been described, it will be understood that within the purview of the invention various changes may be made within the scope of the following claims.

Having thus described my invention, we claim:

1. A fusing machine for fusing a workpiece comprising:
    a vertically-movable electrode carriage;
    an electrode assembly mounted on the lower end of said carriage;
    a first air actuator having an upwardly-extending piston rod engageable with said carriage for raising and lowering said carriage relative to a workpiece;
    a second air actuator comprising a cylinder having a bottom wall at least partially open to atmosphere, a piston slidably mounted within said cylinder, and a downwardly-extending piston rod depending from said piston, said piston rod aligned and engageable with said carriage for exerting pressure between said electrode assembly and said workpiece; and
    a programmable electronic pressure regulating valve that controls the amount of air supplied to the cylinder of said second actuator, thereby controlling the pressures applied by said second air actuator to said carriage, said regulating valve being located closely adjacent the cylinder of said second air actuator to substantially minimize the amount of air that must be moved to effect a pressure increase or decrease.

2. In a fusing machine having a housing, an electrode carriage, an electrode assembly mounted on the lower end of said carriage, and a first air actuator having a piston rod engageable with said carriage for moving said carriage to a raised position remote from a workpiece to be fused and supporting said carriage in a raised position, the improvement comprising:
    a second air actuator comprising a cylinder having a bottom wall at least partially open to atmosphere, a piston movable within said cylinder, and a piston rod depending from said piston engageable with said carriage for applying pressure to said carriage and thereby said electrode assembly during a fusing cycle; and
    a programmable pressure regulating valve for controlling the amount of air supplied to the cylinder of said second air actuator in accordance with a preset schedule, thereby changing the pressure applied to said electrode assembly by said second air actuator in accordance with the preset schedule, said regulating valve being located closely adjacent the cylinder of said second air actuator to substantially minimize the amount of air that must be moved to effect a pressure increase or decrease.

3. A method for fusing armature coil lead wires to commutators or armatures for electric motors, said method comprising the steps of:
    providing a vertically movable assembly having an electrode assembly at its lower end;
    positioning a wound armature assembly with its commutator in the path of vertical movement of said movable assembly;
    supporting said movable assembly in a first position above said armature assembly by a first air actuator;
    permitting said movable assembly to lower under the force of gravity from said first position to a second position wherein said movable assembly engages said commutator so that its downward movement is stopped by said commutator;
    when said movable assembly is in said second position, supplying a fusing current to said electrode assembly and applying downwardly exerted pressures to said movable assembly by a second air actuator comprising a cylinder having a bottom wall at least partially open to atmosphere, a piston slidably mounted within said cylinder, and a piston rod depending from said piston and engaged with said movable assembly;
    while supplying said fusing current, varying the amount of air supplied to the cylinder of said second actuator by use of a programmable pressure regulating valve, thereby varying said downwardly exerted pressures applied to said movable assembly, said regulating valve being located closely adjacent the cylinder of said second air actuator to substantially minimize the amount of air that must be moved to effect a pressure increase or decrease; and
    after completion of a fusing cycle, moving said movable assembly upwardly by energization of said first air actuator.

4. The method of claim 3 wherein said movable assembly lowers at a rate controlled by the rate at which said piston rod of said first air actuator lowers.

5. The method of claim 3 wherein said movable assembly lowers at a rate determined by its rate of descent due to the force of gravity and any frictional resistance to lowering, said piston rod of said first air actuator lowering at a rate exceeding the rate at which said carriage assembly lowers.

6. The fusing machine of claim 1 wherein said regulating valve is mounted on said cylinder.

7. The improvement of claim 2 wherein said regulating valve is mounted on said cylinder.

8. The method of claim 3 wherein said regulating valve is mounted on said cylinder.

9. A fusing machine for fusing a workpiece comprising:
    a vertically-movable electrode carriage;
    an electrode assembly mounted on the lower end of said carriage;
    first means for raising and lowering said carriage relative to a workpiece, said first means including an upwardly-extendable member engageable with said carriage;
    second means, separate from said first means, for exerting pressure between said electrode assembly and said workpiece, said second means including a downwardly-extendable member engageable with said carriage; and a programmable electronic pressure regulating means that controls the pressures applied by said second means to said carriage, said regulating means being located closely adjacent said second means to substantially minimize the response time of said second means.

* * * * *